United States Patent
Bini et al.

(10) Patent No.: US 12,221,904 B2
(45) Date of Patent: Feb. 11, 2025

(54) SPEED REGULATION SYSTEM OF A TURBINE AND RELEVANT CONTROL METHOD

(71) Applicant: TURBODEN S.P.A., Brescia (IT)

(72) Inventors: Roberto Bini, Brescia (IT); Mario Gaia, Brescia (IT)

(73) Assignee: Turboden S.p.A., Brescia (IT)

( * ) Notice: Subject to any disclaimer, the term of this patent is extended or adjusted under 35 U.S.C. 154(b) by 0 days.

(21) Appl. No.: 18/573,658

(22) PCT Filed: Jul. 13, 2022

(86) PCT No.: PCT/IB2022/056450
§ 371 (c)(1),
(2) Date: Dec. 22, 2023

(87) PCT Pub. No.: WO2023/002305
PCT Pub. Date: Jan. 26, 2023

(65) Prior Publication Data
US 2024/0301807 A1    Sep. 12, 2024

(30) Foreign Application Priority Data
Jul. 20, 2021    (IT)    ........................ 102021000019061

(51) Int. Cl.
| | |
|---|---|
| *F01K 13/02* | (2006.01) |
| *F01D 15/10* | (2006.01) |
| *F01K 25/08* | (2006.01) |
| *F02C 1/10* | (2006.01) |
| *F02C 9/16* | (2006.01) |

(52) U.S. Cl.
CPC .............. *F01K 13/02* (2013.01); *F01D 15/10* (2013.01); *F01K 25/08* (2013.01); *F02C 1/10* (2013.01); *F02C 9/16* (2013.01); *F05D 2220/31* (2013.01); *F05D 2220/76* (2013.01)

(58) Field of Classification Search
CPC ................................ F01K 13/00; F01K 13/02
See application file for complete search history.

(56) References Cited

FOREIGN PATENT DOCUMENTS

| | | | | | |
|---|---|---|---|---|---|
| CN | 101162883 | A | * | 4/2008 | ........... F01K 23/101 |
| DE | 102018209203 | A1 | * | 12/2019 | ............. F01D 25/12 |
| EP | 3277933 | B1 | * | 2/2020 | ............. F01K 13/02 |
| FR | 2976136 | A1 | * | 12/2012 | ............. F01K 13/02 |
| WO | WO-2009038562 | A2 | * | 3/2009 | ............. F01D 15/10 |

* cited by examiner

*Primary Examiner* — Laert Dounis
(74) *Attorney, Agent, or Firm* — R. Ruschena Patent Agent, LLC

(57) ABSTRACT

A regulation system (20) of an expansion turbine (3) speed, the system having an organic Rankine cycle system (10) in turn having at least one expansion turbine (3), a control unit (21) which manages all the control processes of the regulation system (20), and regulates the frequency of the electrical energy produced by a generator (4) operating according to a predetermined management logic on one or more of the following components: at least one inlet valve (AV), at least one by-pass valve (BV), an electrical accumulation system (22), a dissipative electrical brake (24), a control of interruptible electrical loads (25) or a system for modulating heat generation or recovery, the predetermined management logic includes a primary regulation that takes place within 10 s and a secondary regulation that takes place in a time between 30 seconds and 30 minutes.

12 Claims, 3 Drawing Sheets

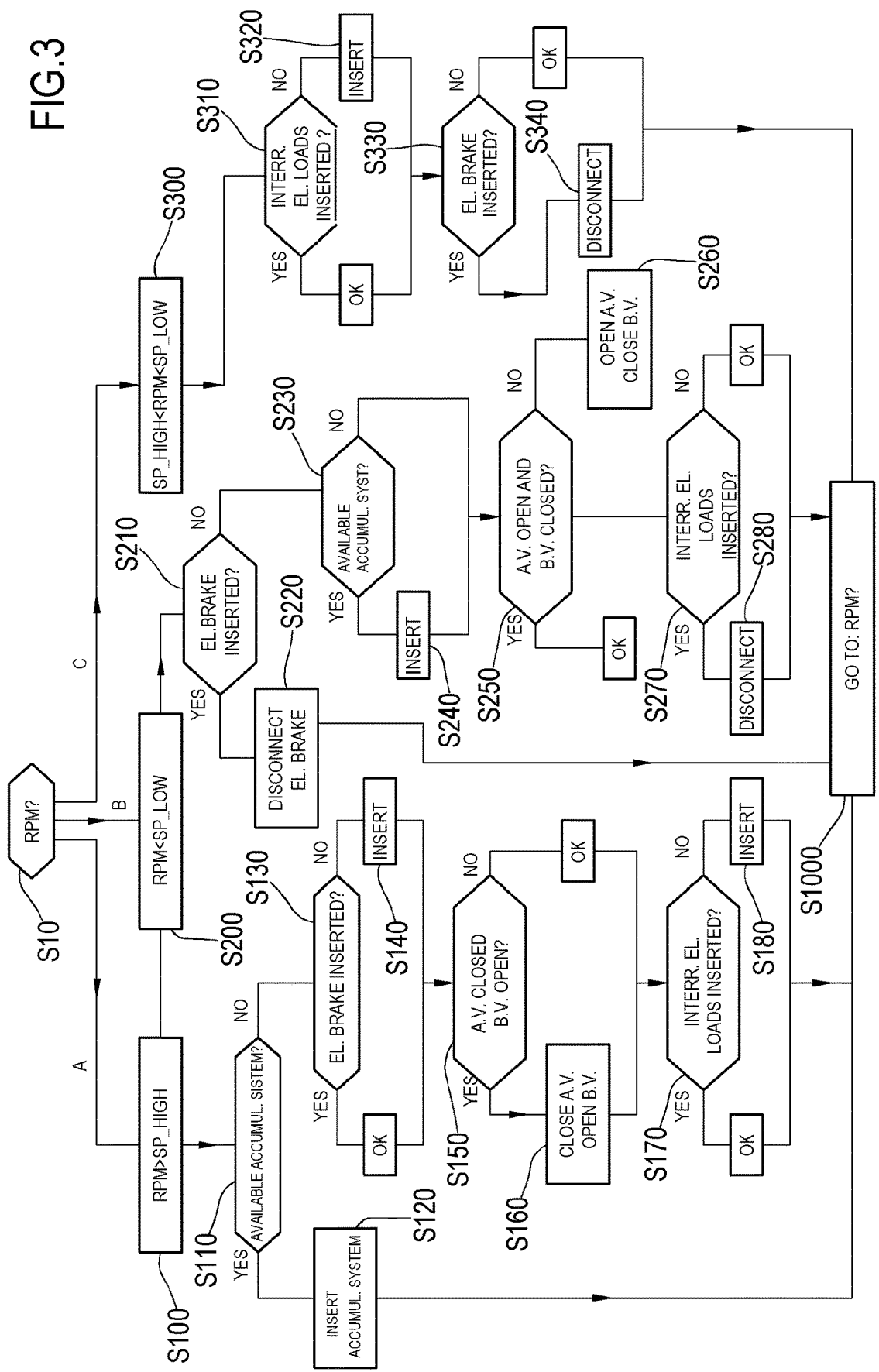

SPEED REGULATION SYSTEM OF A TURBINE AND RELEVANT CONTROL METHOD

BACKGROUND OF THE INVENTION

1. Field of the Invention

The present invention relates to a combined speed regulation system of a turbine and to the related control method. The turbine is suitable for steam thermodynamic cycles and is particularly suitable for an organic Rankine cycle (hereinafter, also ORC cycle). Speed regulation is operated in a combined manner by regulating valves, electric accumulators and electric braking systems.

2. Brief Description of the Prior Art

As is known, a thermodynamic cycle is defined as a finite succession of thermodynamic transformations (for example isothermal, isochoric, isobaric or adiabatic transformations) at the end of which the system returns to its initial state. In particular, an ideal Rankine cycle is a thermodynamic cycle consisting of two adiabatic and two isobaric transformations. Its purpose is to turn heat into work. This cycle is generally adopted mainly in thermoelectric power plants for the production of electricity and uses water as the driving fluid, both in liquid form and in steam form, with the so-called steam turbine.

More specifically, organic Rankine cycles (ORC) have been hypothesized and implemented, which use high molecular mass organic fluids for the most different applications, in particular also for the exploitation of low-medium enthalpy thermal sources. As in other steam cycles, the system for an ORC cycle includes one or more pumps for feeding the organic working fluid, one or more heat exchangers for carrying out preheating, vaporization and possible superheating or heating phases in supercritical conditions of the same working fluid, a steam turbine for the expansion of the fluid, mechanically connected to an electric generator, a condenser which returns the organic working fluid to the liquid state, and a possible regenerator to recover the heat downstream of the turbine and upstream of the condenser.

The problem of adjusting the speed of the turbine has been faced and solved by the Applicant according to what is described in patent EP3277933B1. In the aforementioned patent the problem of regulating a turbine for ORC systems, or a synchronous machine, typically equipped with large and therefore slow valves, is faced and solved. In the case addressed by the previous patent, the ORC system is operated in parallel to an electricity distribution network and the need for a (typically not too rapid) regulation stemmed from a request from the electricity company in order to modulate the power fed into the network, for stabilizing the network itself.

The solution described in the Applicant's previous patent therefore relies exclusively on valves. In particular, the turbine is fed by means of one or more inlet lines, controlled by corresponding regulation valves. At the same time, for plant needs, one or more by-pass lines are provided, controlled by corresponding by-pass valves.

Under normal operating conditions of the system, the working fluid coming from the evaporator passes through the turbine with its maximum flow rate, in order to produce the maximum possible power. In this case the inlet valve is 100% open and the by-pass valve is completely closed. In some circumstances, the plant operator or the electricity network manager may require a quick adjustment of the power supplied, with response times of a few seconds; in other words, the power may be required in order to reduce it within a few seconds, in order to reach a desired value (set point). According to the aforementioned patent, the power regulation is obtained by acting simultaneously (according to a logic described in that patent) on the turbine supply valve and on the bypass valve, in order to try to keep the thermodynamic cycle unchanged even at the cost of dissipating, through the by-pass valve, a portion of the available energy. This solution is satisfactory in the case of operation in parallel with the mains and for adjustments which are not too fast, i.e. of the order of a few seconds.

The regulation issue is more complex when the turbine or, more generally, the turbines are arranged in isolation (with the need, therefore, to keep the generation frequency regulated in correspondence with even sudden load variations) or in parallel to the mains, but in order to meet the requirements imposed by the "gridcodes" (for example, the ability to overcome voltage dips of a certain entity, without disconnecting the generator from the mains as for current regulations or simply for modulating the electrical power quickly). There is also the need to be able to produce a power greater than that available from the thermodynamic system at a given moment, either because the thermodynamic system is in partial load conditions and therefore its thermal inertia does not allow it to increase the load, if not in the order of a few minutes, or because even if in nominal load conditions there may be a production request that exceeds this nominal production value.

Therefore, a need exists, for plants which must constantly work in isolation, to define a faster and more complete regulation system with respect to the one proposed by the Applicant's previous patent and which is also able to accumulate and make available the power at a later time.

SUMMARY OF THE INVENTION

The purpose of the present invention is to define a turbine regulation system, in which various actions can contribute to maintaining the stability of the frequency of the electrical power generated and at the same time to accumulating energy.

According to a first aspect of the present invention, therefore, a system for the combined speed regulation of a turbine is described, having the characteristics set out in the independent product claim annexed to the present description.

Further preferred and/or particularly advantageous embodiments of the aforesaid system are described according to the characteristics set out in the attached dependent claims. According to a further aspect of the present invention, a method for the combined speed regulation of a turbine is also described, having the characteristics set out in the independent method claim annexed to the present description.

The method, according to one of its aspects, can be performed by means of a computer program, comprising a software for carrying out all the above-described steps of the method, in the form of a product for computer programs comprising the computer program.

The computer program product can be configured as a control apparatus for an organic Rankine cycle plant, comprising a control unit, a data carrier and a computer program stored on the data carrier, so that the control apparatus defines the embodiments of the invention in the same way defined by the method. In this case, when the control apparatus performs the computer program, all the steps of the method are also performed as described above.

BRIEF DESCRIPTION OF THE DRAWINGS

The invention will now be described with reference to the attached drawings, which illustrate some non limiting examples of embodiment, in which:

FIG. 3 is a flow chart of the turbine speed regulation procedure.

DETAILED DESCRIPTION OF THE INVENTION

Figure 1:
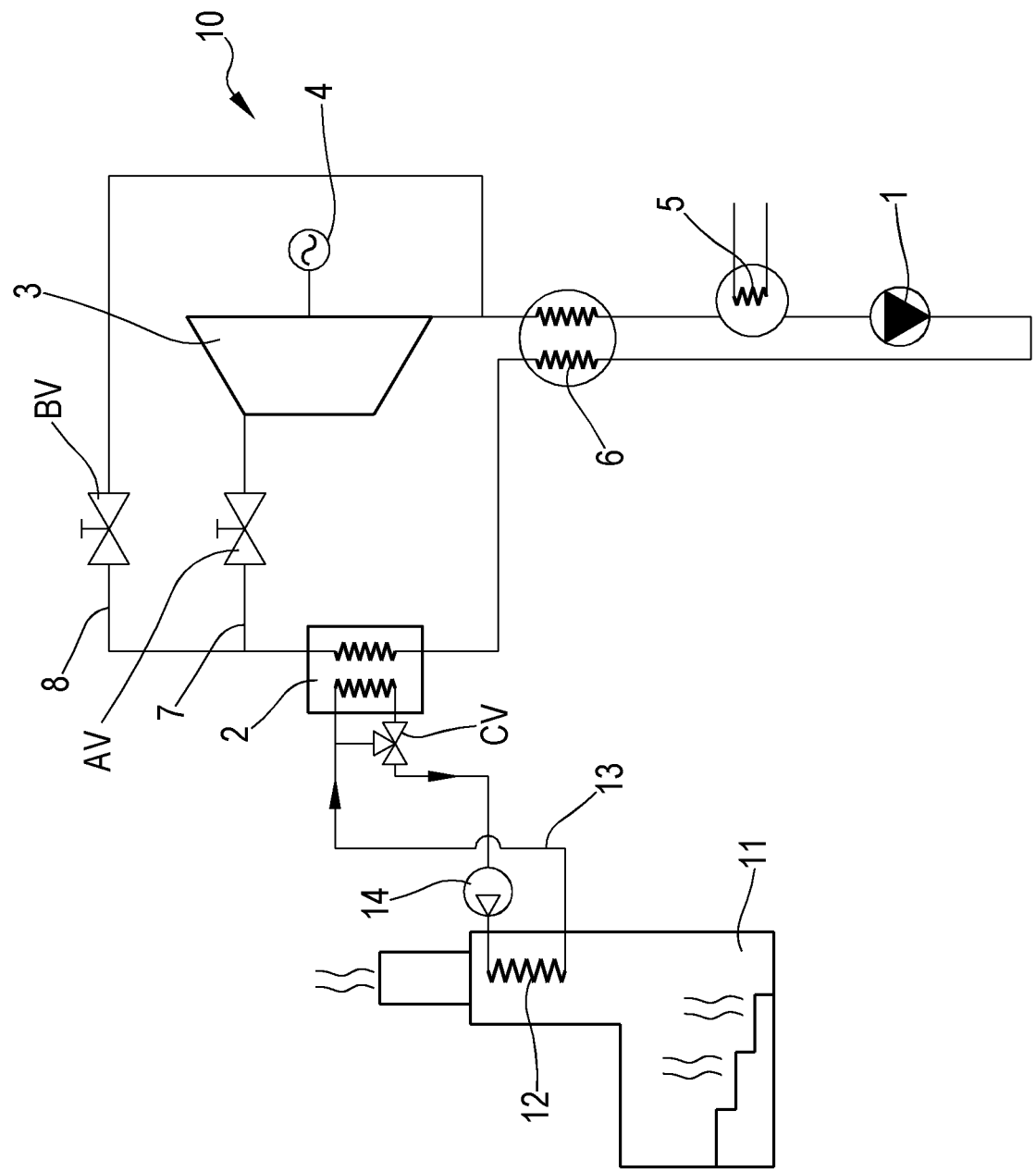
FIG. 1 schematically represents an ORC cycle system, according to the known art, for which it is possible to use the turbine speed regulation system and the relative control method, according to the present invention.

With reference to FIG. 1, reference 10 indicates an organic Rankine cycle system (ORC), according to the known art.

In the embodiment of FIG. 1 the heat source is exemplified as a boiler 11 which burns biomass and supplies heat to the ORC cycle by means of a recovery exchanger 12 and a circuit 13 for heat transfer between the boiler and the ORC (by means of the use of a pump 14) but the heat source could also be of the geothermal type, or industrial heat recovery or solar or other kind of energy. The heat generation or recovery system to the ORC can be modulated, for example, through the CV valve.

The ORC cycle system typically comprises at least one feed pump 1 for feeding an organic working fluid, in liquid phase, to at least one heat exchanger 2. In the heat exchanger, which can in turn comprise a pre-heater, an evaporator and a over-heater, the organic working fluid is heated up to its transformation into the steam phase and its eventual overheating. At the outlet of the heat exchanger, the steam passes through an expansion turbine 3 producing the useful work of the ORC cycle. Such useful work is a mechanical work collected on the turbine shaft which is integrally connected with an electric machine or other operating machine, for example an electric generator 4 which receives mechanical energy and transforms it into electrical energy. Finally, the organic working fluid passes through a condenser 5 which brings it back to the liquid phase to be supplied by the pump 2 back to the heat exchanger. Advantageously, in order to increase cycle efficiency, between the expansion turbine 3 and the condenser 5, a heat regenerator 6 can be inserted, i.e. a heat exchanger which exchanges heat between the organic working fluid in the liquid phase which is pumped from pump 1 towards the heat exchanger 2 and the organic working fluid in the steam phase which from the turbine 3 is directed towards the condenser 5.

The feeding of the organic working fluid in the steam phase to the expansion turbine 3 is carried out by means of at least one inlet line 7, controlled by a corresponding inlet valve AV. Furthermore, for plant engineering requirements, at least one by-pass line 8 is provided, which directly connects the heat exchanger 2 with the regenerator 6 or with the condenser 5, controlled by a corresponding by-pass valve BV.

The speed regulation system 20 of the expansion turbine 3 according to the present invention will now be described with reference to FIG. 2.

The regulation system 20 therefore comprises at least the following components/subsystems:

an ORC cycle system 10 in turn comprising, among other components, at least one expansion turbine 3, provided with at least one of its inlet valve AV and at least one of its by-pass valve BV, the turbine being mechanically connected to an electric power generator 4, as there is a relatively long intervention and adjustment time for the turbine speed, for example in the range 5 s-20 s, a control unit 21 which manages all the control processes of the regulation system 20, an electrical accumulation system 22, for example at least one electric battery, a bidirectional conversion system 23 for the conversion from alternating current to direct current, to the electrical accumulation system 22, and from direct current to alternating current of the energy stored in the electrical accumulation system 22. The conversion system 23, for example, may include a rectifier and an inverter, a dissipative electric brake 24, a system for modulating the heat generation or recovery, for example schematically shown by a valve CV, a control for interruptible electrical loads 25, i.e. with a lower power supply priority than other electrical loads present in the network, not indicated in the Figure.

Figure 2:
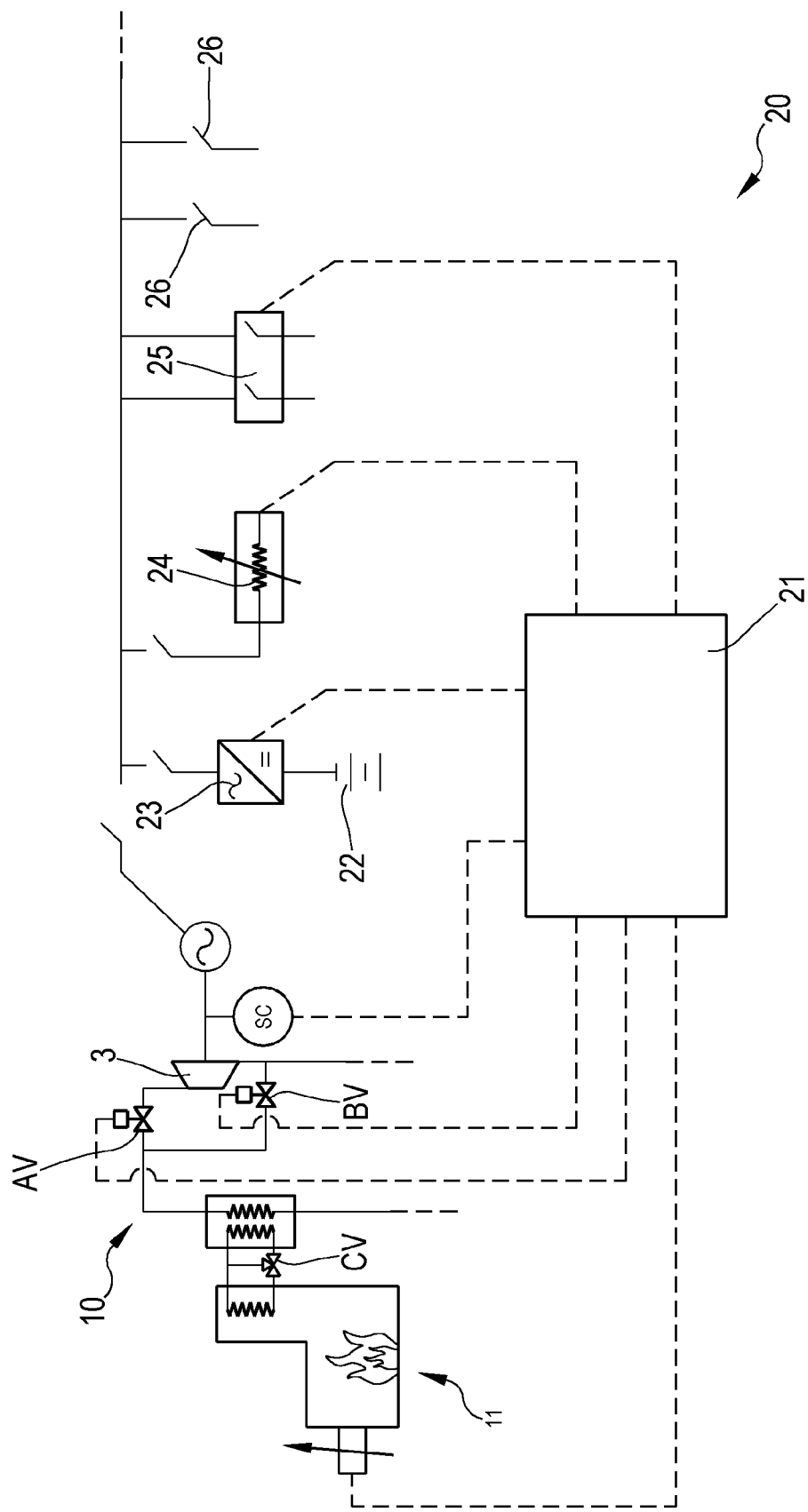
FIG. 2 represents a general diagram of the combined speed regulation system of a turbine, according to an embodiment of the present invention.

In FIG. 2 the so-called privileged electrical loads are also schematically shown with the reference number 26, i.e. those electrical loads to which the power supply cannot be interrupted.

A logic which can be implemented in the speed regulation system 20 of turbine 3 is described below. It is to be considered completely by way of example and not exhaustive.

First of all one should understand which can be the needs that impose the regulation of the turbine speed.

A first need for regulating the turbine speed may arise when there is a rapid load decrease on the stand alone network. In this case, the RPM speed of the turbine 3 and consequently the voltage frequency generated by the generator 4 tends to increase, so exceeding a maximum speed threshold: RPM>SP_HIGH. The control unit 21 of the regulation system 20 is able to act on the following components, by requesting:

a closing of the inlet valve AV of the turbine 3 and an opening of the by-pass valve BV.

Typically, these valves have slow opening/closing dynamics: complete opening and complete closing are both achieved in times of 5-20 seconds, being large throttle valves (for example, from 6" to 12" for a power of 1 to 10 MW) of the pneumatic type with a "fail safe" device equipped with an elastic element, intervention and modulation of the electrical accumulation system 22, which may have a relatively short intervention and regulation time, of the order of 0.1 s Is. Such procedure will obviously be adopted if the electric accumulator is not already fully charged and therefore it is available to receive further energy. If the electric accumulator is in this condition, it will be able to absorb electric power by acting as a brake for the mechanical turbine-electric generator train, the actuation of the control of the interruptible electric loads 25 (i.e. of their insertion), should such interruptible electric loads have been previously disconnected.

The intervention and regulation time, in this case, is relatively short, of the order of 0.1 s, finally, the actuation of the dissipative electric brake 24, which may have a relatively short intervention and adjustment time, is of the order of 0.1 s-1 s.

The control unit 21 must decide the intervention sequence of the various functions according to the operating status of the same at that moment, or according to predefined management criteria (for example, instead of closing the AV inlet valve of turbine 3, it is possible to decide to allocate all the available power surplus to the electrical accumulation system 22) and taking into account the speed and extent of the braking action required.

A second and opposite need for regulating the speed of the turbine may arise when there is a rapid increase in the power required on the in isolation network. In this case, the speed RPM of the turbine 3 and consequently the frequency of the voltage generated by the generator 4 tend to decrease, so falling below a minimum speed threshold: RPM<SP_LOW.

The control unit 21 of the regulation system 20 is able to act on the following components, by requesting:

an opening of the at least one inlet valve AV of turbine 3, if not already open, and a closing of the at least one by-pass valve BV, if not already closed. a modulated withdrawal of electrical power from the accumulation system 22, a reduction in the intervention of the dissipative electric brake 24, if in use at that moment, an interruption of interruptible electrical loads 25.

Also in this case, the control unit 21 must decide the intervention sequence of the various functions according to the operating status of the same at that moment, or according to predefined management criteria.

Finally, the control logic must also be able to manage the RPM speed regulation of the turbine, when this increasing or decreasing speed is comprised within the two maximum and minimum thresholds: SP_LOW<RPM<SP_HIGH. This is because, although the turbine speed is within an acceptable range, it is possible that the operation of some devices of the adjustment system 20 can be optimized. For example, this entails the disconnection of the dissipative electric brake 24, if not necessary or the insertion of the interruptible electrical loads, if there is sufficient energy availability.

A possible logic control scheme is illustrated in the flow diagram of FIG. 3. The scheme starts from the control S10 of the speed of the turbine 3 and branches into the three possible alternatives:—S100: RPM>SP_HIGH, i.e. the turbine speed exceeds its maximum threshold, according to path A in FIG. 3, S200: RPM<SP_LOW, i.e. the turbine speed exceeds its minimum threshold, according to path B in FIG. 3, and S300: SP_LOW<RPM<SP_HIGH, i.e. the speed is comprised within the two maximum and minimum thresholds, according to path C in FIG. 3.

Starting from an increase in the turbine speed above its maximum threshold S100 (path A), the control unit 21 will check at S110 if the accumulation system 22 is available to receive further load. In case of positive verification, at S120 the accumulation system 22 will be inserted and at S1000 it will return to the initial speed check S10.

Returning to step S110, if the accumulation system is fully loaded and therefore unable to receive further electrical power, at S130 it will be checked whether the dissipative electrical brake 24 is engaged. If the answer is negative, one will proceed with the activation at S140 of the dissipative electric brake 24.

In sequence, at S150 it will be checked whether the inlet valve AV of the turbine 3 is closed and whether the by-pass valve BV of the turbine 3 is open. In the event of a negative response, one will proceed with the closing at S160 of the inlet valve AV of the turbine 3 and with the opening at S160 of the by-pass valve BV of the turbine 3, in order to limit the use of the brake itself.

Then, one will proceed by checking at S170 if the interruptible electrical loads 25 are inserted and, in case of a negative response, they will be inserted at S180. Finally, at S1000 it will be returned to the initial speed check at S10.

Instead, starting from a reduction of the turbine speed below its minimum threshold at S100 (path B), the control unit 21 will initially check at S210 if the dissipative electric brake 24 is engaged. In the event of a positive check, the dissipative electric brake 24 will be released at S220 and at S1000 it will return to the initial speed check at S10.

Returning to step S210, if the dissipative electric brake has already been deactivated, at S230 it will be checked if the accumulation system 22 is available for delivering further load. In the event of a positive check, at S240 power will be taken from the accumulation system 22.

In sequence, at S250 it will be checked if the inlet valve AV of the turbine 3 is open and if the by-pass valve BV of the turbine 3 is closed. In the event of a negative response, the opening at S260 of the admission valve AV of turbine 3 will proceed with the closing at S260 of the by-pass valve BV of the turbine 3.

Then, at S270 it will be checked if the interruptible electric loads 25 are connected and, in the event of a positive response, the interruptible electric loads 25 will be disconnected at S280. Finally, at S1000 it will be returned to the initial speed check at S10.

If the turbine speed is comprised between two maximum and minimum thresholds (at S300, path C) it is necessary to check at S310 if the interruptible electrical loads 25 are inserted and if not, they will be engaged at S320 in order to prevent that the electrical loads continue to be disengaged in presence of a correct speed. Also, at S330 it will be checked if the dissipative electrical brake 24 is engaged. In case of a positive check, the dissipative electric brake 24 will be disengaged at S340 in order to avoid unnecessary energy losses.

The sequences indicated are therefore part of a control loop that is repeated cyclically (for example, by PLC) at very short intervals (for example, 10 ms-50 ms per cycle) in order to check almost continuously any change in indicated conditions, and to modify, if necessary, the interventions implemented, as indicated.

It should be noted that the aforementioned control logic will be further subject to the nature of the primary source that feeds the ORC cycle system. For example, in the case of biomass feeding, when opening or closing the valve CV of FIG. 2 it indirectly will change the power to the furnace of the boiler. This type of regulation is certainly much slower than those described above, i.e. of the order of at least 20-40 min in order to pass from a minimum load to a maximum load. In any case, by operating in this way, a further control parameter will be available according to the forecast of power delivery in the following hours.

The regulation needs are of two different orders of importance: there is a primary or essential regulation, which is able to guarantee the stability of regulation of the grid frequencies and there is a secondary or 'optimizing' regulation, which is able to optimize the energy management in the isolated network.

Typically, the first need requires a rapid adjustment (of the order of the second or lower, as a speed-frequency variation can be rapid in the presence of abrupt changes in electrical load) whereas the second need accepts slower adjustments (of the order of tens of seconds, minutes or even hours).

To each of the two categories it is possible to associate the subsystems on which it is necessary to act in order to obtain the desired effect, according to the scheme described in the following table.

TABLE

|  | Primary adjustment (fast) | Primary adjustment (medium-fast) | Secondary adjustment (slow) |
| --- | --- | --- | --- |
| Required (indicative) intervention time | 0.1-1 s | 1-10 s | 30 s-30 m |
| Action on | Batteries/ inverters Electric brake Interruptible loads | Turbine valve By-pass valve | Regulation of the thermal system which powers the generation cycle |

Of course, systems with shorter intervention times can also be used for slow adjustments.

All present systems have a limit or a limited operation range and often a non-linear response. In particular:
the turbine valves, both the inlet and by-pass ones, are typically of the throttle type, with regulation from 0% to 100% (complete closing/full opening) with a strong non-linear behavior,
batteries/inverters: from 0 to 100% of the sizing load with linear behavior except in extreme cases, that is, when a full charge is reached, therefore, being "unable to receive additional electrical power", or in the case of discharged batteries, therefore, being "unable to supply electrical power",
electric brake: 0-100% of the sizing load,
interruptible loads: gradually according to the number and extent of the loads themselves,
primary regulation of the thermal system which powers the generation cycle: from a minimum load to 100% of the sizing load. The minimum permissible load depends on the source used. For example, for a biomass plant it can be of around 30%.

Finally, by means of the proposed turbine speed regulation system, the dual function of carrying out a 'rapid' regulation of the ORC cycle system is performed (which typically never lends itself to a rapid power regulation due to the nature of the thermodynamic cycle, and the slowness of the valves normally used) in order to keep the grid frequency stable in an isolated system and, at the same time, for deciding a management of the various available resources (primary fuel, accumulator, etc.) in order to make a slow regulation of the system.

In addition to the embodiments of the invention, as described above, it is to be understood that there are numerous further variants. It must also be understood that said embodiments are only examples and do not limit neither the aim of the invention, nor its applications, nor its possible configurations. On the contrary, although the above description makes it possible for the skilled person to implement the present invention at least according to an exemplary configuration thereof, it must be understood that numerous variants of the components described are conceivable, without thereby departing from the aim of the invention, invention, as defined in the attached claims.

The invention claimed is:

1. A regulation system (20) of an expansion turbine (3) speed in an isolated grid, comprising:
an organic Rankine cycle system (10) comprising at least one expansion turbine (3), said expansion turbine being provided with at least one inlet valve (AV) and at least one by-pass valve (BV) and mechanically connected to a generator (4) of electricity;
a control unit (21) configured to control processes of the regulation system (20);
an electric accumulation system (22);
a dissipative electric brake (24);
a control for interruptible electrical loads (25);
a system for modulating heat generation or recovery of the organic Rankine cycle system;
wherein the control unit (21) is configured to regulate the speed of the expansion turbine (3) and the frequency of the electrical energy produced by the generator (4) operating according to a predetermined management logic on the at least one inlet valve (AV), the at least one by-pass valve (BV), the electrical accumulation system (22), the dissipative electric brake (24), the control of interruptible electrical loads (25) and the system for modulating the heat generation or recovery of the organic Rankine cycle system; and
wherein the predetermined management logic includes a primary regulation that takes place within 10 s for guaranteeing the stability of regulation of the grid frequencies and a secondary regulation that takes place in a time between 30 s and 30 min for optimizing the energy management in the isolated grid.

2. The regulation system (20) according to claim 1, further comprising a conversion system (23) which converts alternating current into direct current, accumulating energy in the electrical accumulation system (22) and from this energy, direct current into alternating current.

3. The regulation system (20) according to claim 1, wherein said primary regulation takes place within 1 second and acts on the electric storage system (22), on the dissipative electric brake (24) or on the control of interruptible electric loads (25).

4. The regulation system (20) according to claim 1, wherein the primary regulation takes place in a time between 1 second to 10 seconds and acts on the at least one inlet valve (AV) or on the at least one by-pass valve (BV).

5. The regulation system (20) according to claim 1, wherein the secondary regulation acts on the system for modulating the heat generation or recovery of the organic Rankine cycle system.

6. A method for controlling the regulation system (20) of an expansion turbine (3) speed according to claim 1, said method comprising at least one of the following steps, according to the predetermined management logic:
opening/closing the at least one inlet valve (AV) of the turbine (3);
opening/closing the at least one by-pass valve (BV) of the turbine (3);
actuating and modulating the electrical accumulation system (22), according to a bidirectional approach for the accumulation of electrical energy and its reuse for the generation of electrical power;
activating the dissipative electric brake (24); and
activating/disconnecting a command for the interruptible electrical loads (25).

7. The method according to claim 6, wherein when the speed (RPM) of the expansion turbine (3) is higher than a maximum threshold (SP_HIGH), the method further comprises: a) actuating the electrical accumulation system (22) if able to receive additional electrical load, b) activating the dissipative electric brake (24), if the electric accumulation system is at full load, c) closing the at least one inlet valve (AV) of the turbine (3), if open, and opening the at least one by-pass valve (BV) of the turbine (3), if closed, and d) inserting interruptible electrical loads (25), if disconnected.

8. The method according to claim 6, wherein when the speed (RPM) of the expansion turbine (3) is below a minimum threshold (SP_LOW), the method further comprises: a) releasing the dissipative electric brake (24), if activated, b) activating the electrical accumulation system (22) if able to supply further electrical load and if the dissipative electrical brake (24) has not been activated, c) opening the at least one inlet valve (AV) of the turbine (3), if closed, and closing the at least one by-pass valve (BV) of the turbine (3), if open, d) disconnecting interruptible electrical loads (25), if inserted.

9. The method according to claim 6, wherein when the speed (RPM) of the expansion turbine (3) is between a minimum threshold (SP_LOW) and a maximum threshold (SP_HIGH), the method further comprises: a) inserting the interruptible electrical loads (25), if disconnected, b) releasing the dissipative electric brake (24), if activated.

10. The method according to claim 6, further comprising a slow regulation of a primary heat source which supplies heat to the organic Rankine cycle system.

11. The method according to claim 10, wherein the primary heat source is a biomass and the slow regulation comprises modulating the power to a furnace of a boiler.

12. A computer program product comprising computer program code stored on a non-transitory computer-readable medium, said computer program code configured for carrying out the method according to claim 6.

\* \* \* \* \*